(12) United States Patent
Bode Mortensen

(10) Patent No.: US 11,477,941 B2
(45) Date of Patent: Oct. 25, 2022

(54) CONDITIONER UNIT

(71) Applicant: Kverneland Group Kerteminde AS, Kerteminde (DK)

(72) Inventor: Martin Bode Mortensen, Odense (DK)

(73) Assignee: KVERNELAND GROUP KERTEMINDE AS, Kerteminde (DK)

( * ) Notice: Subject to any disclaimer, the term of this patent is extended or adjusted under 35 U.S.C. 154(b) by 199 days.

(21) Appl. No.: 16/098,816

(22) PCT Filed: Apr. 26, 2017

(86) PCT No.: PCT/EP2017/059986
§ 371 (c)(1),
(2) Date: Nov. 2, 2018

(87) PCT Pub. No.: WO2017/191022
PCT Pub. Date: Nov. 9, 2017

(65) Prior Publication Data
US 2020/0323137 A1    Oct. 15, 2020

(30) Foreign Application Priority Data
May 3, 2016   (GB) ...................................... 1607661

(51) Int. Cl.
*A01D 43/10*    (2006.01)
*A01D 82/00*    (2006.01)
*A01D 82/02*    (2006.01)

(52) U.S. Cl.
CPC ........... *A01D 43/102* (2013.01); *A01D 82/00* (2013.01); *A01D 82/02* (2013.01)

(58) Field of Classification Search
CPC ...... A01D 43/10; A01D 43/102; A01D 42/00; A01D 82/02; A01D 82/00; A01D 43/08
See application file for complete search history.

(56) References Cited

U.S. PATENT DOCUMENTS 3,369,324 A * 2/1968 Tremblay ................ B02C 23/00
    49/280
3,417,928 A * 12/1968 Gundlach ................. B02C 4/32
    241/32

(Continued)

FOREIGN PATENT DOCUMENTS

EP   1277604 A2   1/2003
EP   2123146 A1   11/2009

(Continued)

OTHER PUBLICATIONS

International Search Report issued in connection with PCT Application No. PCT/EP2017/059986, dated Jun. 6, 2017.

(Continued)

*Primary Examiner* — Thomas B Will
*Assistant Examiner* — Madeline I Runco
(74) *Attorney, Agent, or Firm* — Steven M. Shape

(57) ABSTRACT

A conditioner unit (6) for conditioning an agricultural crop material comprises a pair of rolls (20a, 20b) configured for rotation in opposite directions and providing a nip (22) through which crop material passes. An adjusting mechanism (31) is provided for adjusting a pressing force applied by the rolls (20a, 20b) to the crop material as it passes through the nip. The adjusting mechanism (31) includes at least one hydraulic actuator (30) connected to at least one of the rolls (20a, 20b) and a hydraulic circuit (33) that supplies hydraulic fluid to the actuator (30), the hydraulic circuit being configured so that in a first operational mode the rolls (20a, 20b) are pressed towards one another and in a second operational mode the rolls (20a, 20b) are pushed apart to provide a gap between the rolls.

16 Claims, 6 Drawing Sheets

(56) References Cited

U.S. PATENT DOCUMENTS

| | | | | |
|---|---|---|---|---|
| 3,890,770 A * | 6/1975 | Milliken | ............... | A01D 82/02 56/16.4 A |
| 3,938,732 A * | 2/1976 | Schrimper | ............... | B02C 4/32 241/231 |
| 4,078,734 A * | 3/1978 | Purrer | ............... | A01F 29/14 241/222 |
| 4,150,524 A * | 4/1979 | Sawyer | ............... | A01D 82/02 56/1 |
| 4,220,288 A * | 9/1980 | Gatley | ............... | B02C 4/32 241/101.2 |
| 4,316,411 A * | 2/1982 | Keaton | ............... | B30B 5/06 100/154 |
| 4,546,599 A | 10/1985 | Cicci et al. | | |
| 4,747,260 A * | 5/1988 | Petrasch | ............... | A01F 29/10 241/101.742 |
| 5,894,716 A * | 4/1999 | Haldeman | ............... | A01D 43/10 56/14.5 |
| 5,950,938 A * | 9/1999 | Nishizaki | ............... | A01D 82/02 241/28 |
| 6,029,432 A | 2/2000 | Kraus | | |
| 6,050,070 A * | 4/2000 | Cook | ............... | A01D 82/00 56/14.1 |
| 6,425,232 B1 | 7/2002 | Desnijder et al. | | |
| 6,499,283 B1 * | 12/2002 | Cook | ............... | A01D 82/02 56/16.4 B |
| 6,711,996 B1 * | 3/2004 | Mackie | ............... | A01D 82/02 100/169 |
| 8,056,309 B2 * | 11/2011 | Vandendriessche | ............... | A01F 29/10 56/16.4 B |
| 8,632,028 B2 * | 1/2014 | Euculano | ............... | B02C 4/02 241/231 |
| 9,155,250 B2 * | 10/2015 | Posselius | ............... | A01F 15/07 |
| 9,173,347 B2 * | 11/2015 | Posselius | ............... | A01F 15/07 |
| 9,648,809 B2 * | 5/2017 | Pruitt | ............... | A01D 43/10 |
| 2004/0255566 A1 * | 12/2004 | Phillips | ............... | A01D 82/00 56/16.4 R |
| 2005/0126147 A1 | 6/2005 | Nickel et al. | | |
| 2007/0113533 A1 * | 5/2007 | Schafer | ............... | A01F 29/10 56/16.4 R |
| 2008/0261670 A1 | 10/2008 | Potthast | | |
| 2009/0288382 A1 * | 11/2009 | Vandendriessche | ............... | A01F 29/10 56/16.4 B |
| 2011/0232248 A1 | 9/2011 | Nickel et al. | | |
| 2012/0056027 A1 * | 3/2012 | Euculano | ............... | B02C 4/32 241/227 |
| 2013/0174529 A1 * | 7/2013 | Hyronimus | ............... | A01D 75/00 56/314 |
| 2014/0263786 A1 * | 9/2014 | Tamura | ............... | B02C 25/00 241/121 |
| 2015/0266027 A1 * | 9/2015 | Hamilton | ............... | F16H 7/06 241/264 |
| 2015/0319924 A1 * | 11/2015 | Strobbe | ............... | A01D 34/006 56/14.7 |
| 2017/0006773 A1 * | 1/2017 | Stephenson | ............... | A01D 34/664 |

FOREIGN PATENT DOCUMENTS

| | | | | |
|---|---|---|---|---|
| FR | 2740654 B1 * | 4/2001 | ............ | A01F 29/10 |
| WO | 2015183532 A1 | 12/2015 | | |
| WO | WO-2015183532 A1 * | 12/2015 | ............ | A01D 43/10 |

OTHER PUBLICATIONS

Search Report issued in connection with GB1607661.4 dated Oct. 28, 2016.

\* cited by examiner

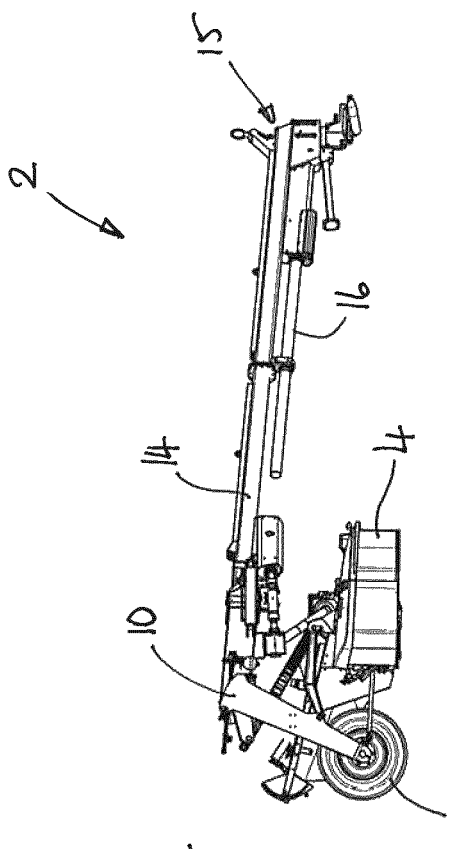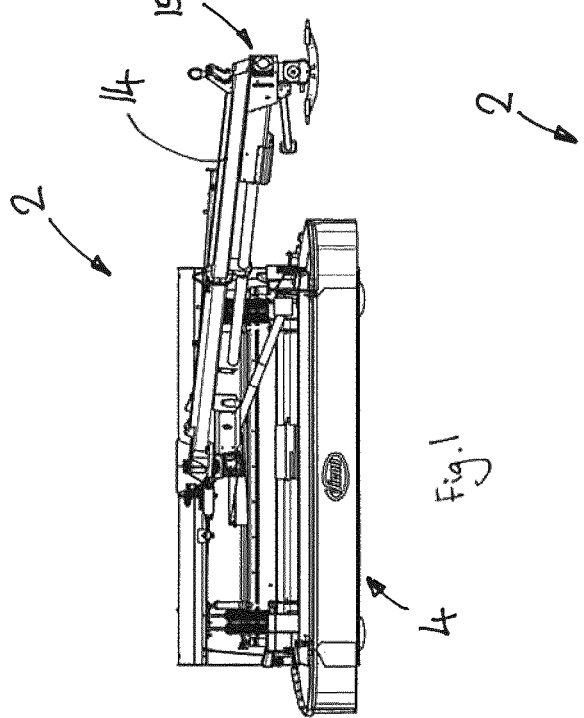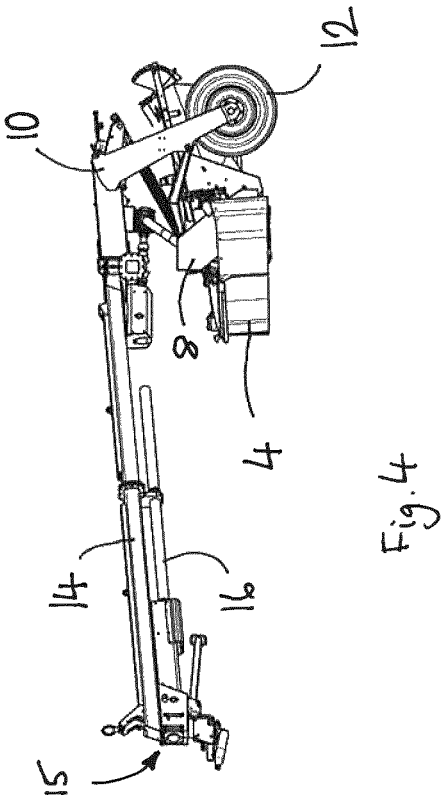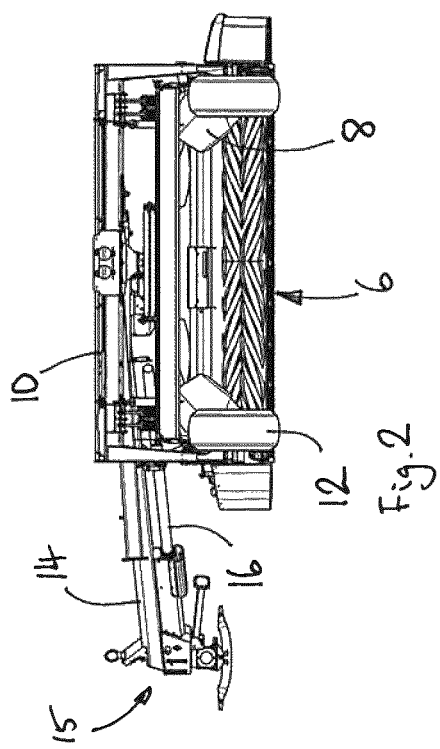

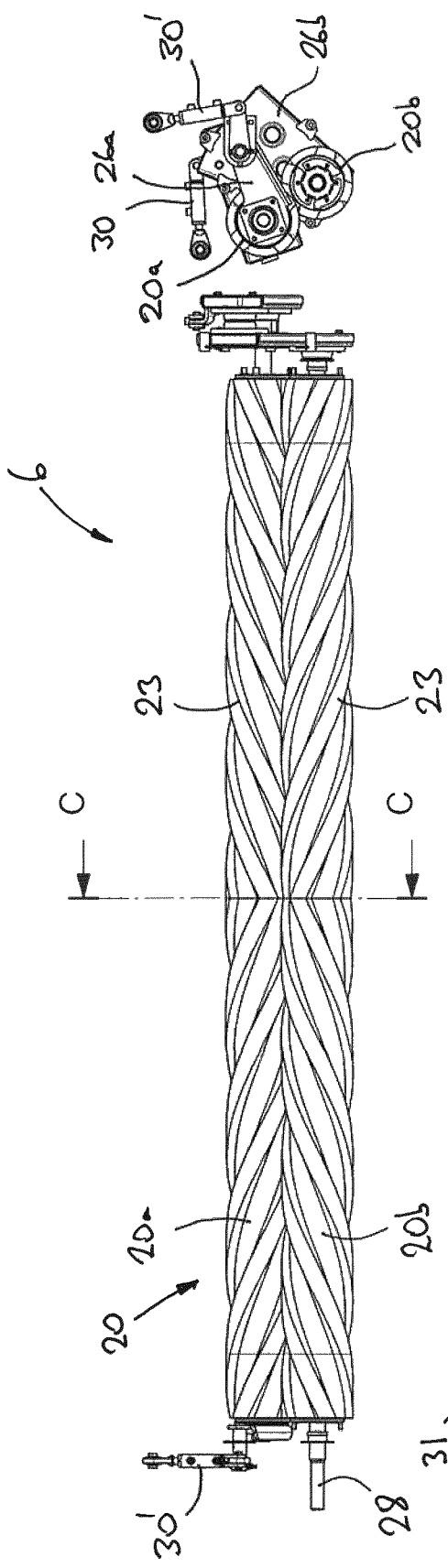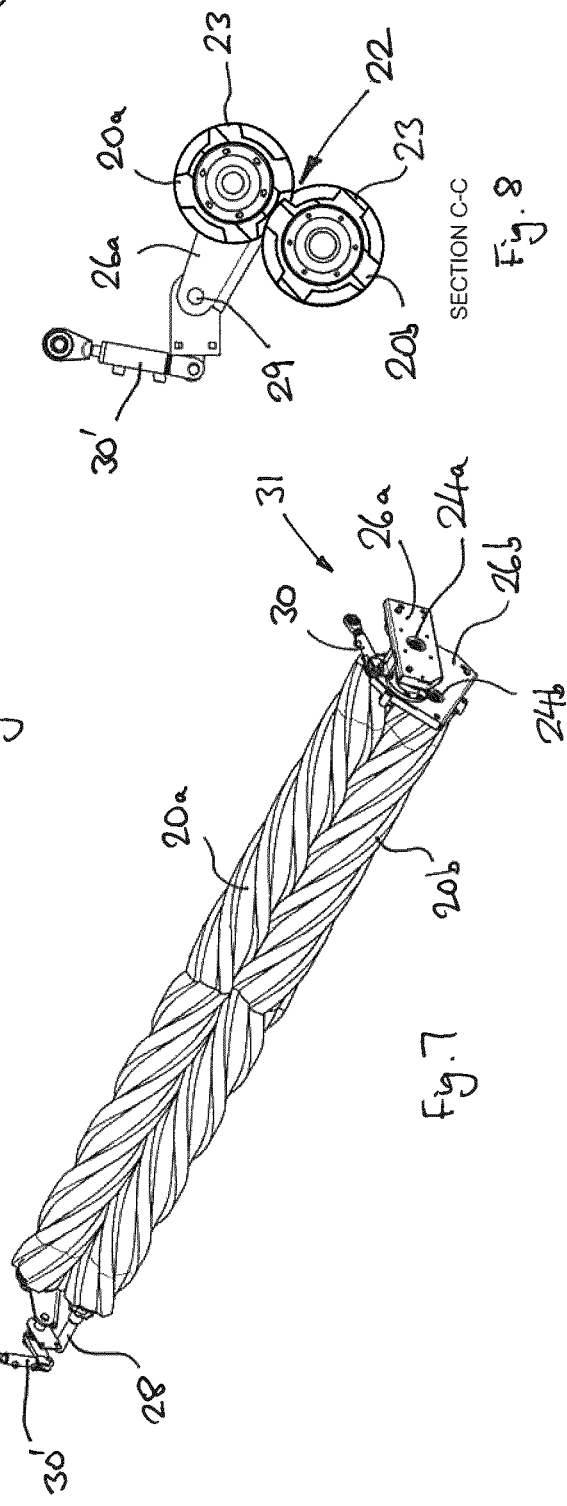

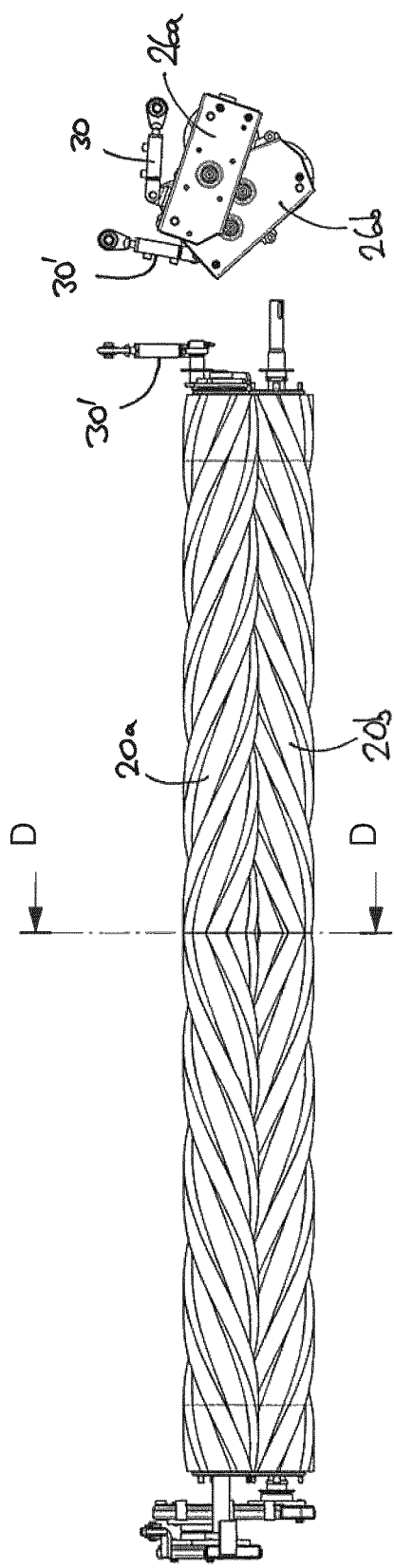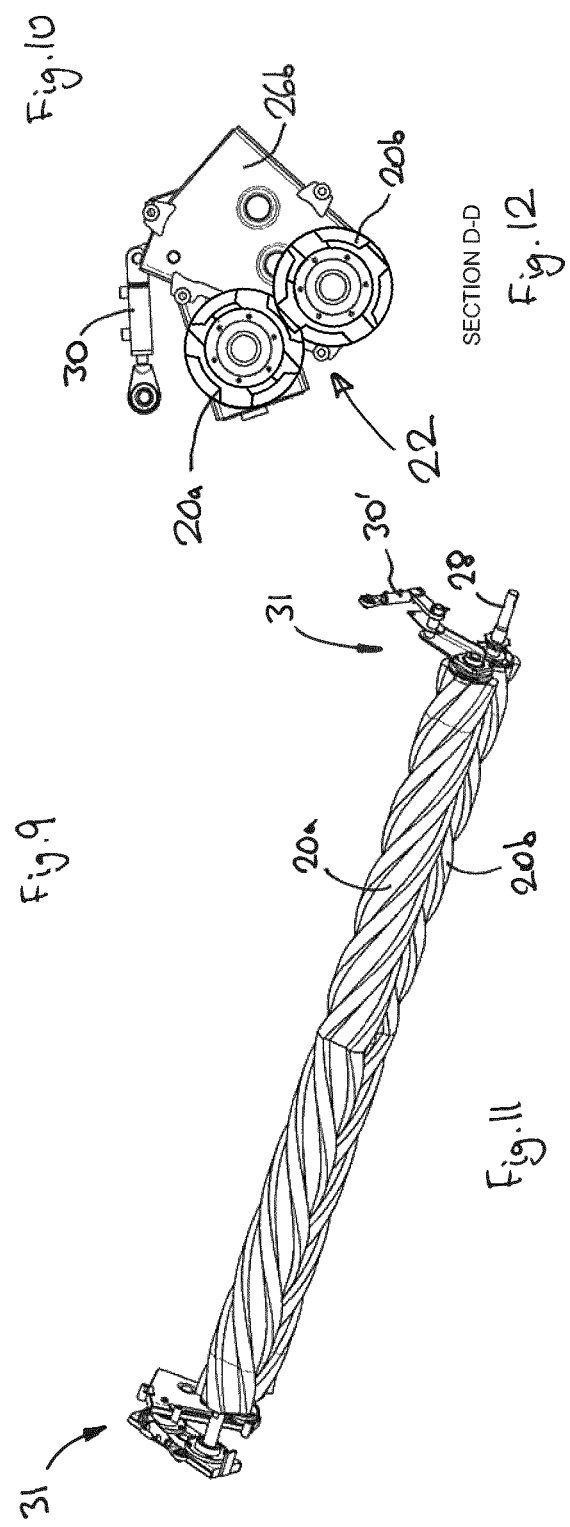

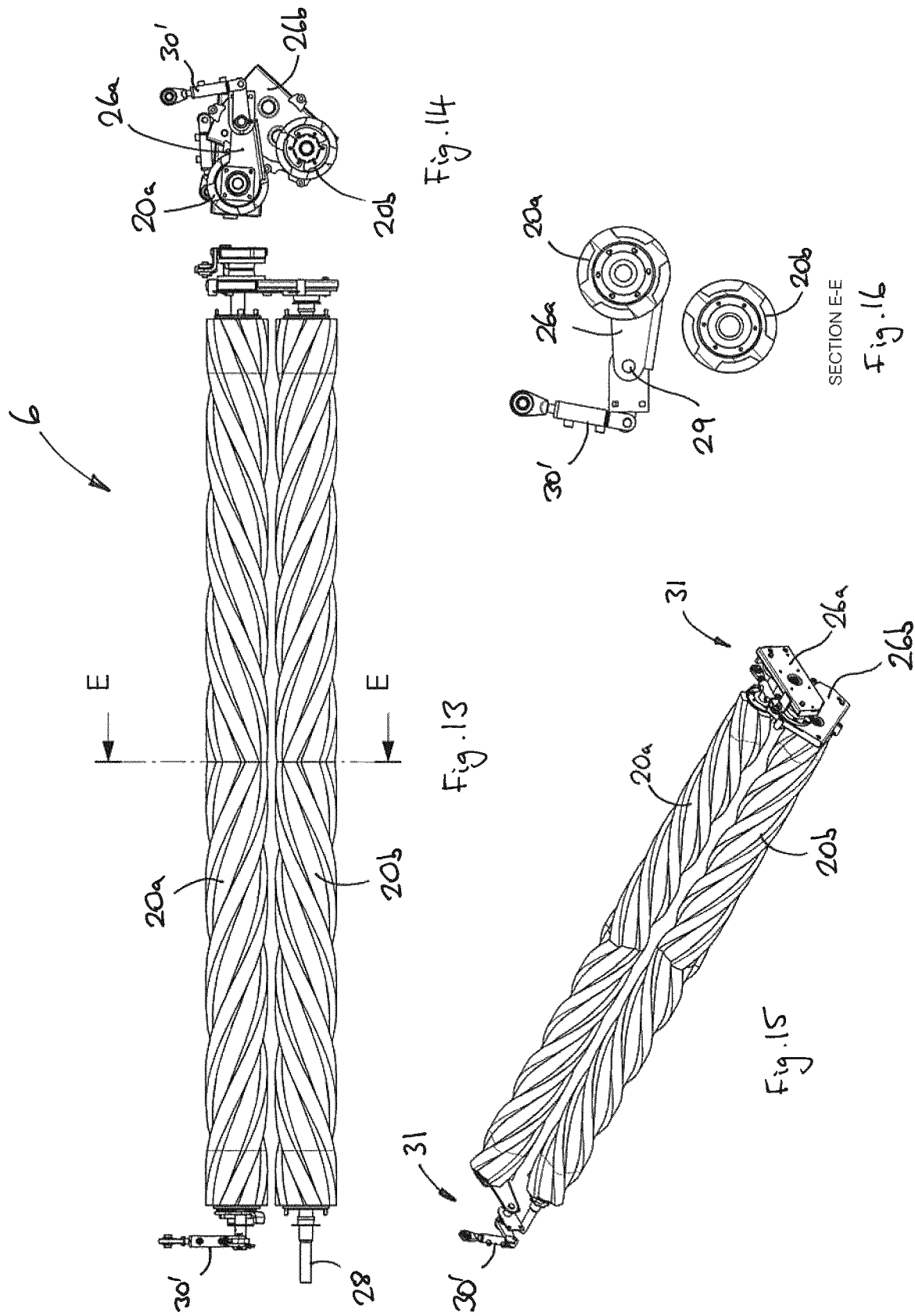

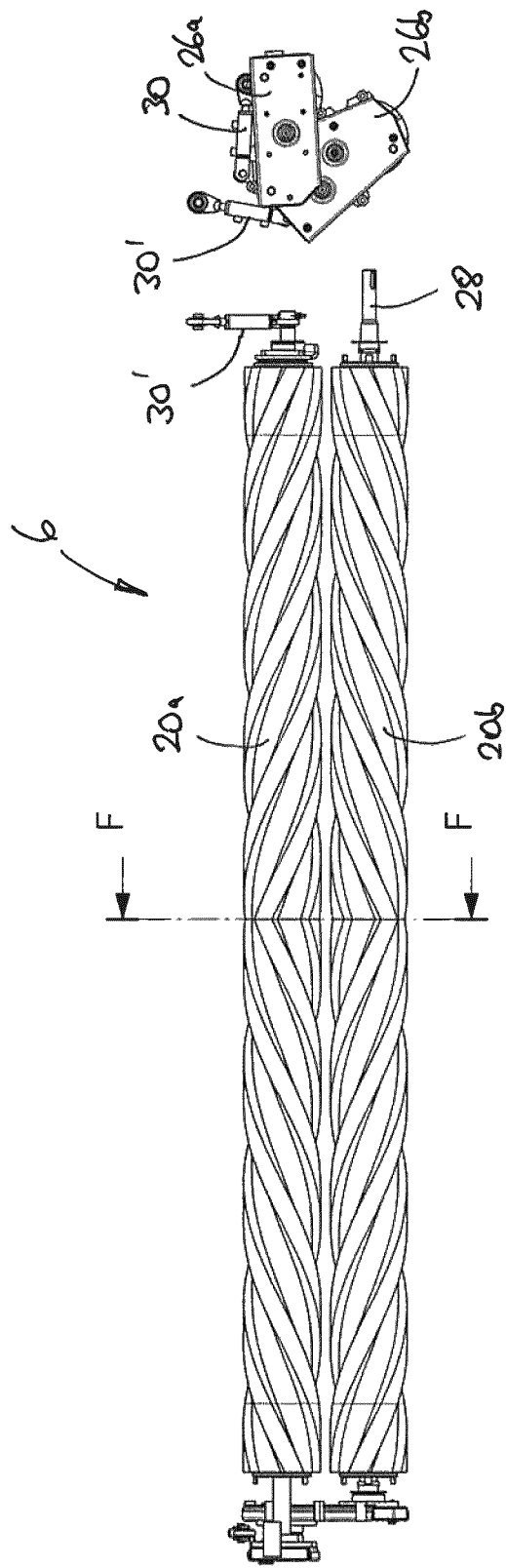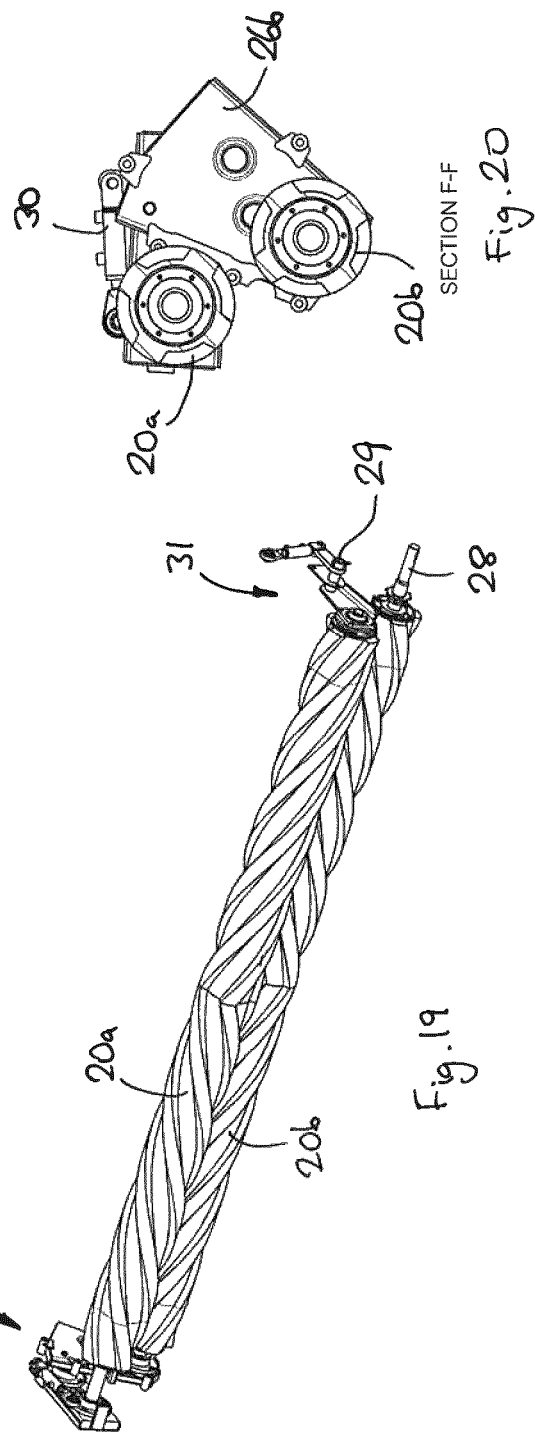
Fig. 17
Fig. 18
Fig. 19
Fig. 20
SECTION F-F

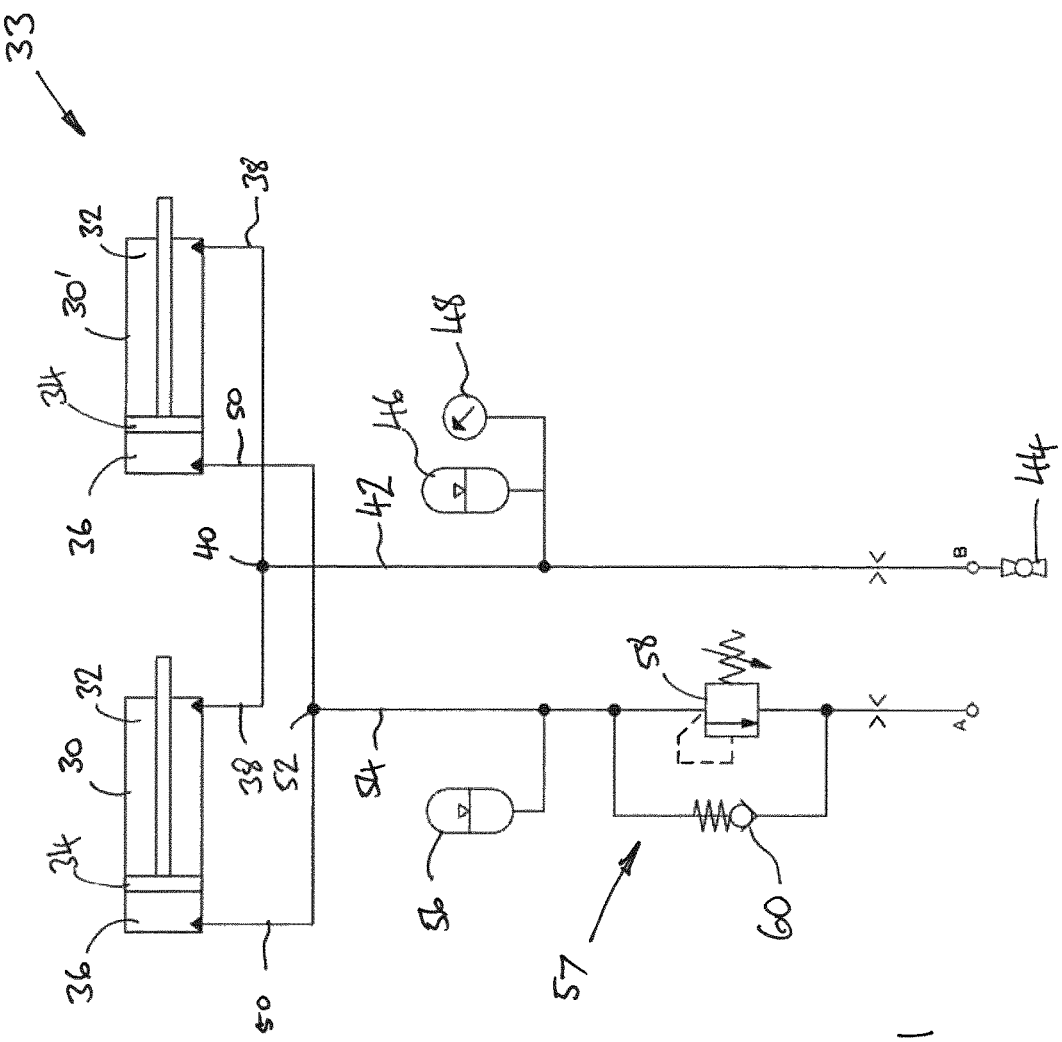

CONDITIONER UNIT

CROSS-REFERENCE TO RELATED APPLICATIONS

This is a 35 U.S.C. 371 National Stage Patent Application of International Application No. PCT/EP2017/059986, filed Apr. 26, 2017, which claims priority to Great Britain application 1607661.4, filed May 3, 2016, each of which is hereby incorporated by reference in its entirety.

The present invention relates to a conditioner unit for conditioning cut agricultural crops. In particular, the invention relates to a conditioner unit of the roller type. The invention also relates to a mower-conditioner (or "MoCo"), which combines a mower unit with a conditioner unit and is operable to condition crop materials as they are cut.

Conditioner units are used to bruise and crush the stalks of cut agricultural crops to aid wilting and drying. They may be used with various types of agricultural crop, for example grass, alfalfa and other crops, which after drying can be collected and baled or chopped ready for use as animal feed, bedding, fuel, or for other purposes. There are two main types of conditioner unit: flail conditioners have a plurality of flail arms mounted on a rotating bar that beat the crop against a conditioner plate, and roller conditioners have a pair of contra-rotating rolls with raised interlocking patterns of rubber or steel forms, providing a nip through which the cut crop is passed so that the crop is crimped between the rollers. The present invention is concerned primarily with roller conditioners.

Usually, the conditioner unit is part of a combined MoCo apparatus, which may be towed behind a tractor, carried on an arm or attached to the front of a tractor. However, it may also be a stand-alone unit or part of another machine.

The rolls of a roller conditioner are usually pressed resiliently towards one another, allowing the rolls to separate slightly as the crop passes through the nip. The roller pressure is usually applied mechanically, for example by springs, which can be adjusted to control the roller pressure and the degree of conditioning applied to the crop. Adjusting the roller pressure is usually a manual job, requiring the operator to leave the cab of the tractor and adjust the springs using tools. This is inconvenient and time-consuming.

Sometimes, during use, crop material can become wrapped around the rolls leading to a blockage. To remove the wrapped crop material the operator again has to leave the cab of the tractor and cut away the wrapped crop using a knife. Sometimes, the rolls have to be forced apart with a lever to aid cleaning, which is difficult and again time-consuming.

It is an object of the present invention to provide a conditioner unit that mitigates one or more of the aforesaid problems.

According to one aspect of the present invention there is provided a conditioner unit for conditioning an agricultural crop material, comprising a pair of rolls configured for rotation in opposite directions and providing a nip through which crop material passes, and an adjusting mechanism for adjusting a pressing force applied by the rolls to the crop material as it passes through the nip, wherein the adjusting mechanism includes at least one hydraulic actuator connected to at least one of the rolls and a hydraulic circuit that supplies hydraulic fluid to the actuator, wherein the hydraulic circuit is configured so that in a first operational mode the rolls are pressed towards one another and in a second operational mode the rolls are pushed apart to provide a gap between the rolls.

The provision of a hydraulic actuator and a hydraulic circuit that enable the rolls to be either pressed towards one another or pushed apart to provide a gap between the rolls makes it easy to switch the conditioner unit between a closed working configuration and an open non-working configuration in which the rolls can be cleaned and any crop material that has become wrapped around the rolls can be easily removed. This greatly simplifies the work of the operator and allows for more efficient operation of the conditioner unit. The use of a hydraulic actuator to control both of these functions also simplifies the mechanical construction of the conditioner unit, reducing costs and increasing the reliability of the apparatus. The hydraulic actuator also allows the rolls to be set apart with a selected adjustable gap between the rolls.

In an embodiment, the hydraulic actuator is a double-acting hydraulic cylinder having first and second chambers, the hydraulic circuit being configured such that in the first operational mode the hydraulic pressure is greater in the first chamber, and in the second operational mode the hydraulic pressure is greater in the second chamber.

The use of a double-acting hydraulic cylinder allows both operational modes of the conditioner unit to be selected using a single component, again simplifying the mechanical construction of the conditioner unit, reducing costs and increasing reliability. Alternatively, a single-acting hydraulic cylinder can be used.

In an embodiment, the first chamber is at a rod end of the hydraulic cylinder and the second chamber is at a cap end of the hydraulic cylinder. Since the effective area of the actuator is greater at the cap end of the hydraulic cylinder, supplying hydraulic fluid at an equal pressure to both chambers will cause the actuator to extend, thereby setting the conditioner into the open, non-working configuration. The conditioner unit can then be set back to the closed working configuration by reducing the pressure in the second chamber.

In an embodiment, the hydraulic circuit includes a first fluid supply line connected to the first chamber and configured to control the supply of hydraulic fluid to the first chamber during the first operational mode.

In an embodiment, the first fluid supply line includes an accumulator configured to enable the flow of hydraulic fluid to and from the first chamber during the first operational mode in response to relative movement of the rolls. The accumulator allows the roll pressure to be set, thus controlling the degree of conditioning applied to the crop. This can be controlled remotely, for example from the cab of the tractor, allowing for efficient operation.

In an embodiment, the first fluid supply line includes a valve configured to control the flow of hydraulic fluid to and from the first fluid supply line. The valve can be operated to control the amount of fluid supplied to the accumulator, thus setting the roll pressure. Again, this can be adjusted remotely.

In an embodiment, the first fluid supply line includes a gauge indicating the pressure of hydraulic fluid in the first fluid supply line. This allows the operator to set the roll pressure according to the required level of conditioning.

In an embodiment, the hydraulic circuit includes a second fluid supply line connected to the second chamber and configured to control the supply of hydraulic fluid to the second chamber during the second operational mode. Fluid can thus be supplied through the second fluid line to put the conditioner unit into the open, non-working configuration for cleaning.

In an embodiment, the second fluid supply line includes an accumulator configured to enable a flow of hydraulic fluid to and from the second chamber during the first operational mode in response to relative movement of the rolls. This prevents a vacuum being created in the second chamber as the rolls move in response to crop material passing through the nip between the rolls.

In an embodiment, the second fluid supply line includes a sequence valve configured to maintain a lower hydraulic pressure in the second chamber than the first chamber during the first operational mode, so that the first chamber maintains a positive roll pressure when the conditioner unit is working.

In an embodiment, the sequence valve includes a check valve that permits a flow of hydraulic fluid into the second chamber at a first pressure, in parallel with a pressure relief valve that permits a flow of hydraulic fluid from the second chamber at a second higher pressure.

In an embodiment, the conditioner unit includes a pair of hydraulic actuators connected to opposite ends of at least one of the rolls. This helps to ensure an even roll pressure across the width of the conditioner unit. Alternatively, one actuator may be provided, along with a mechanism for distributing the load applied by the actuator to both ends of the moving roll or rolls.

In an embodiment, the hydraulic actuators are configured to operate in unison. This may be achieved, for example by use of a hydraulic T junction or a flow divider.

In an embodiment, the rolls include interlocking surface formations that are configured to deform a crop material as it passes through the nip between the rolls. The surface formations may for example comprise rubber or steel forms. Alternatively, one or both of the rolls may be provided with a smooth roll surface.

According to another aspect of the invention there is provided a mower-conditioner including a mower unit that is configured to cut an agricultural crop material and a conditioner unit according to any one of the preceding statements of invention, wherein the conditioner unit is configured to condition a cut crop material received from the mower unit.

An embodiment of the invention will now be described, by way of example, with reference to the accompanying drawings, in which:

FIG. 1 is a front view of MoCo apparatus;
FIG. 2 is a rear view of a MoCo apparatus;
FIG. 3 is a right side view of a MoCo apparatus;
FIG. 4 is a left side view of a MoCo apparatus;
FIGS. 5-8 show a conditioner unit in a closed working configuration, wherein FIG. 5 is a rear view, FIG. 6 is a right side view, FIG. 7 is a rear isometric view and FIG. 8 is a sectional view on line C-C of FIG. 5;
FIGS. 9-12 show the conditioner unit in a closed working configuration, wherein FIG. 9 is a front view, FIG. 10 is a left side view, FIG. 11 is a front isometric view and FIG. 12 is a sectional view on line D-D of FIG. 9;
FIGS. 13-16 show the conditioner unit in an open configuration, wherein FIG. 13 is a rear view, FIG. 14 is a right side view, FIG. 15 is a rear isometric view and FIG. 16 is a sectional view on line E-E of FIG. 13;
FIGS. 17-20 show the conditioner unit in an open configuration, wherein FIG. 17 is a front view, FIG. 18 is a left side view, FIG. 19 is a front isometric view and FIG. 20 is a sectional view on line F-F of FIG. 17, and
FIG. 21 is a hydraulic circuit diagram for the conditioner unit.

The MoCo apparatus 2 shown in FIGS. 1-4 is configured to operate as a trailed unit, which is towed behind a tractor. Alternatively, the MoCo apparatus may be configured for example to be carried by a support arm or attached to the front of a tractor, or any other alternative configuration.

The MoCo apparatus 2 includes a mower 4, which in this embodiment is depicted as a disc mower. Alternatively, the mower unit 4 may be a drum mower, a sickle bar mower or any other type of agricultural mower.

A conditioner unit 6 is mounted behind the mower unit 4 and is configured to condition the crop material immediately after it has been cut. The mower unit 4 may for example be arranged to feed the cut crop material directly to the conditioner unit 6 for conditioning. The cut crop material passes through the conditioner unit 6 and is then discharged onto the ground as a swath or windrow. Swath boards 8 are provided in this embodiment to guide and shape the swath or windrow as the cut and conditioned crop material is discharged.

The MoCo apparatus 2 is supported by a frame 10, which is provided with a pair of support wheels 12. A draw bar 14 is attached to the frame 10, the draw bar 14 having a hitch 15 at its front end for attaching the MoCo apparatus to a tractor (not shown). A power take-off (PTO) shaft 16 is provided, allowing the MoCo apparatus to be driven from the PTO unit of the tractor.

The conditioner unit 6, which forms part of the MoCo apparatus 2, is shown in more detail in FIGS. 5-20. Alternatively, the conditioner unit 6 may be a standalone unit or part of another machine.

The conditioner unit 6 includes a pair of parallel elongate rolls 20, comprising an upper roll 20a and a lower roll 20b. The rolls are driven from the PTO shaft 16 and are configured to rotate in opposite directions so that the crop material passes from front to rear through the nip 22 between the rolls.

The rolls 20a, 20b have raised interlocking patterns of rubber or steel forms or formations 23, which crush and split the stalks of the crop material as it passes through the nip 22, to aid drying and wilting of the crop. The embodiment shown the drawings is of the type having helical rubber forms 23 on the rolls 20. It should be understood however that other forms may also be used.

It should be noted that in this embodiment the rolls 20a, 20b are not positioned directly one above the other, the upper roll 20a being positioned in front of the lower roll 20b in the working direction.

The upper roll 20a is supported at each end by a rotary bearing 24a, which is carried by an upper support arm 26a. Similarly, the lower roll 20b is supported at each end by a rotary bearing 24b, which is carried by a lower support arm 26b. The lower roll 20b is configured to be driven by a drive shaft 28, which is driven from the tractor's power take off, and the upper roll 20a is driven from the lower roll 20b through a scissor gear mechanism within the upper and lower support arms 26a,b.

The lower support arm 26b is fixed in position, but the upper support arm 26a is supported via a pivot 29, which allows the upper roll 20a to move towards or away from the lower roll 20b. Pivoting movement of the upper support arms 26a is controlled by a pair of hydraulic actuators 30, one actuator being positioned at each end of the conditioner unit 6. The actuators 30, 30' also control the pressure applied to the conditioning rolls 20a, 20b, thus controlling the level of conditioning applied to the crop. Alternatively, the upper support arm 26a may be fixed in position and the lower support arm 26b may be movable, or the upper and lower support arms 26a, 26b may both be movable. The upper and lower support arms 26a, 26b and the hydraulic actuators 30 comprise an adjusting mechanism 31 for adjusting a pressing force applied by the rolls to the crop material as it passes through the nip 22.

The conditioner unit 6 is shown in a closed, working configuration in FIGS. 5-12. In this configuration the conditioner rolls 20a, 20b are pressed towards each other by the actuators 30, 30', so that crop material passing through the nip 22 between the rollers is crushed and bent, thus aiding wilting of the crop. In FIGS. 13-20 the conditioner unit 6 is shown in an open, non-working condition, in which the conditioner rolls 20a, 20b have been separated to provide a gap between the rolls. This is achieved by pivoting the upper support arm 26a upwards relative to the lower support arm 26b. When the conditioner unit 6 is in the open, non-working configuration, the conditioner rolls 20a, 20b can be easily cleaned and any crop material that has become wrapped around the rolls can be removed.

The roll pressure applied to the conditioning rolls 20a, 20b when they are in the closed working configuration, and adjustment of the rolls 20a, 20b between the closed working configuration and the open non-working configuration, is controlled by means of a hydraulic circuit 33, which supplies hydraulic fluid to the actuators 30, 30'. An example of a suitable hydraulic circuit 33 is shown in FIG. 21.

The hydraulic actuators 30, 30' are both double-acting actuators, each having a first chamber 32 at the rod end of the cylinder (on the smaller side of the piston 34) and a second chamber 36 at the cap end of the cylinder (on the larger side of the piston 34). When hydraulic fluid is supplied to the first chamber 32 of each actuator, the piston 34 moves to the left (as depicted in the drawing) and the actuator contracts, thus pressing the conditioner rolls 20a, 20b towards one another. The conditioner unit 6 thus adopts the closed working configuration. When hydraulic fluid is supplied to the second chamber 36, each piston 34 moves to the right, extending the actuators 30, 30' and separating the conditioner rolls 20a, 20b so that the conditioner unit 6 adopts the open non-working configuration.

The first chambers 32 of the actuators 30, 30' are connected through first branch lines 38 and a first T-piece 40 to a first fluid supply line 42, which is connected to a first fluid outlet B, for example of a tractor. The flow of fluid through the outlet B is controlled by a ball valve 44, which can preferably be actuated from the cab of the tractor. A first accumulator 46 and a pressure gauge 48, for example a manometer, are connected to the first fluid supply line 42.

The second chambers 36 of the hydraulic actuators 30, 30' are connected through second branch lines 50 and a second T-piece 52 to a second fluid supply line 54, which is connected to a second fluid outlet A, for example of a tractor. The flow of fluid through the outlet A can also be controlled from the cab of the tractor, for example by a second ball valve (not shown). A second accumulator 56 is connected to the second fluid supply line 54. A pilot-operated pressure relief valve 58 and a check valve 60 are connected in parallel in the second fluid supply line 54 between the second fluid outlet A and the second accumulator 56.

The T-pieces 40, 52 ensure an equal flow of hydraulic fluid to both actuators 30, 30' thereby ensuring an even roll pressure across the width of the conditioner unit 6 when the conditioner rolls 20a, 20b are pressed together in the closed working configuration, and ensuring that the conditioner rolls 20a, 20b move apart evenly when moving to the open non-working configuration.

To set the conditioner unit into the working condition, the ball valve 44 is opened, allowing hydraulic fluid to flow through the first fluid inlet/outlet B into the first chambers 32 of the hydraulic actuators 30, 30' through the first fluid supply line 42 and the first branch lines 38. This causes the pistons 34 to move to the left (as depicted in the drawing), thereby retracting the actuators and causing the rolls 20a, 20b to move to the closed working configuration. Fluid also flows into the first accumulator 46, setting the hydraulic pressure in the system and the roll pressure (i.e. the force pressing the rolls 20a, 20b towards each other). The hydraulic pressure is displayed on the manometer 48 and the operator can close the ball valve 44 when the desired pressure is reached. This can be done remotely, for example from the cab of the tractor. The accumulator 46 allows hydraulic fluid to flow to and from the first chambers 32 of the hydraulic actuators 30, 30' as the rolls 20a, 20b move apart and together in response to crop material passing through the nip 22 between the rolls.

In order to ensure that a vacuum is not created in the second chambers 36 of the actuators 30, 30' as the rolls 20a, 20b are forced apart by crop material passing through the nip 22, a small positive hydraulic pressure is maintained in the second chambers 36 by supplying hydraulic fluid through the second fluid supply line 54 to the second accumulator 56. Fluid therefore flows backwards and forwards between the second chambers 36 and the second accumulator 56 as the rolls 20a, 20b move together and apart. The fluid pressure in the second accumulator 56 is controlled by a sequence valve arrangement 57 comprising a check valve 60 and a pilot-operated pressure relief valve 58. The check valve 60 allows fluid to be supplied under pressure to the second accumulator 56 through the one-way relief valve 60 from the second inlet/outlet port A, and the pilot operated pressure relief valve 58 controls the maximum pressure in the second accumulator 56 by opening to release fluid from the second fluid supply line 54 when the pressure in the line exceeds a predetermined value. When the rolls 20a, 20b are forced apart by crop material passing thorough the nip 22, fluid flows from the second accumulator 56 into the second chambers 36 of the actuators 30, 30' preventing the formation of a vacuum.

To set the conditioner unit 6 into the open, non-working configuration, fluid is supplied to the second chambers 36 of the actuators 30, 30' from the second inlet/outlet port A through the second fluid supply line 54 and the second branch lines 50. The fluid also flows into the second accumulator 56, increasing the hydraulic pressure in the second chambers 36 of the actuators 30, 30'. When this pressure exceeds the pressure in the first chambers 32, the pistons 34 move to the right (as depicted in the drawings), causing the actuators 30, 30' to extend and thus separating the conditioner rolls 20a, 20b so that they move the open, non-working configuration. The operator can then easily remove any crop material that has become wrapped around the rolls, or carry out other required maintenance tasks. Again, the rolls 20a, 20b can be moved to the open non-working configuration by operating a remote control, for example in the cab of a tractor.

The hydraulic system therefore allows the operator to adjust the pressure applied to the conditioner rolls 20a, 20b, and move the conditioner rolls to an open, non-working configuration, using a remote control device without leaving the cab of the tractor and without the use of tools. The operator can therefore adjust the pressure of the conditioner rolls and change the configuration of the conditioner unit between a closed working configuration and an open non-working configuration (and vice versa) easily and quickly, without leaving the cab of a tractor, thus improving efficiency and saving time, while also optimising the conditioning operation.

The invention claimed is:

1. A conditioner unit for conditioning an agricultural crop material by bruising and crushing stalks of the agricultural crop material, comprising:
a pair of rolls configured for rotation in opposite directions and forming a nip between the pair of rolls through which crop material passes, wherein the pair of rolls includes interlocking surface formations configured to deform a crop material as the crop material passes through the nip; and
an adjusting mechanism configured to adjust a pressing force applied by the pair of rolls to the crop material as the crop material passes through the nip, wherein the adjusting mechanism includes a hydraulic actuator connected to at least one roll of the pair of rolls, and a hydraulic circuit configured to supply hydraulic fluid to the hydraulic actuator, wherein the hydraulic circuit is configured such that in a first operational mode the pair of rolls are pressed together by the hydraulic actuator and in a second operational mode the pair of rolls are pushed apart by the hydraulic actuator to provide a gap between the pair of rolls, and the hydraulic actuator is a double-acting hydraulic cylinder having a first chamber and a second chamber, the hydraulic circuit further configured such that in the first operational mode a first hydraulic pressure in the first chamber is greater than a second hydraulic pressure in the second chamber to press the pair of rolls together into a closed working condition, and in the second operational mode the second hydraulic pressure in the second chamber is greater than the first hydraulic pressure in the first chamber to push apart and separate the pair of rolls into an open non-working condition.

2. The conditioner unit according to claim 1, wherein the first chamber is at a rod end of the double-acting hydraulic cylinder and the second chamber is at a cap end of the double-acting hydraulic cylinder.

3. The conditioner unit according to claim 1, wherein the hydraulic circuit includes a first fluid supply line connected to the first chamber and configured to control the supply of hydraulic fluid to the first chamber during the first operational mode.

4. The conditioner unit according to claim 3, wherein the first fluid supply line includes an accumulator configured to enable the flow of hydraulic fluid to and from the first chamber during the first operational mode in response to relative movement of the pair of rolls.

5. The conditioner unit according to claim 3, wherein the first fluid supply line includes a valve configured to control the flow of hydraulic fluid to and from the first fluid supply line.

6. The conditioner unit according to claim 3, wherein the first fluid supply line includes a gauge that indicates a pressure of hydraulic fluid in the first fluid supply line.

7. The conditioner unit according to claim 1, wherein the hydraulic circuit includes a second fluid supply line connected to the second chamber and configured to control a supply of hydraulic fluid to the second chamber during the second operational mode.

8. The conditioner unit according to claim 7, wherein the second fluid supply line includes an accumulator configured to enable a flow of hydraulic fluid to and from the second chamber during the first operational mode in response to relative movement of the pair of rolls.

9. The conditioner unit according to claim 7, wherein the second fluid supply line includes a sequence valve configured to maintain the second hydraulic pressure in the second chamber lower than the first hydraulic pressure in the first chamber during the first operational mode.

10. The conditioner unit according to claim 9, wherein the sequence valve includes a check valve that permits a flow of hydraulic fluid into the second chamber in parallel with a pressure relief valve that permits a flow of hydraulic fluid from the second chamber.

11. The conditioner unit according to claim 1, including a pair of hydraulic actuators connected to opposite ends of at least one roll of the pair of rolls.

12. The conditioner unit according to claim 11, wherein the pair of hydraulic actuators are configured to operate in unison.

13. A mower-conditioner comprising:
a mower unit configured to cut an agricultural crop material; and
a conditioner unit operatively coupled to the mower unit, the conditioner unit configured to condition a cut crop material received from the mower unit by bruising and crushing stalks of the crop material, the conditioner unit including:
a pair of rolls configured for rotation in opposite directions and forming a nip between the pair of rolls through which crop material passes, wherein the pair of rolls includes interlocking surface formations configured to deform a crop material as the crop material passes through the nip; and
an adjusting mechanism configured to adjust a pressing force applied by the pair of rolls to the crop material as the crop material passes through the nip, wherein the adjusting mechanism includes a hydraulic actuator connected to at least one roll of the pair of rolls, and a hydraulic circuit configured to supply hydraulic fluid to the hydraulic actuator, wherein the hydraulic circuit is configured such that in a first operational mode the pair of rolls are pressed together by the hydraulic actuator and in a second operational mode the pair of rolls are pushed apart by the hydraulic actuator to provide a gap between the pair of rolls, and the hydraulic actuator is a double-acting hydraulic cylinder having a first chamber and a second chamber, the hydraulic circuit further configured such that in the first operational mode a first hydraulic pressure in the first chamber is greater than a second hydraulic pressure in the second chamber to press the pair of rolls together into a closed working condition, and in the second operational mode the second hydraulic pressure in the second chamber is greater than the first hydraulic pressure in the first chamber to push apart and separate the pair of rolls into an open non-working condition.

14. The mower-conditioner according to claim 13, wherein the first chamber is at a rod end of the double-acting hydraulic cylinder and the second chamber is at a cap end of the double-acting hydraulic cylinder.

15. The mower-conditioner according to claim 13, wherein the hydraulic circuit includes a second fluid supply line connected to the second chamber and configured to control a supply of hydraulic fluid to the second chamber during the second operational mode.

16. The mower-conditioner according to claim 15, wherein the second fluid supply line includes a sequence valve configured to maintain ft the second hydraulic pressure in the second chamber lower than the first hydraulic pressure in the first chamber during the first operational mode.

\* \* \* \* \*